(12) United States Patent
Wolf-Monheim

(10) Patent No.: US 10,814,686 B2
(45) Date of Patent: Oct. 27, 2020

(54) VEHICLE SUSPENSION

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 123 days.

(21) Appl. No.: 15/924,246

(22) Filed: Mar. 18, 2018

(65) Prior Publication Data

US 2018/0272820 A1    Sep. 27, 2018

(30) Foreign Application Priority Data

Mar. 22, 2017 (DE) .......................... 10 2017 204 788

(51) Int. Cl.
*B60G 11/10* (2006.01)
*B60G 9/02* (2006.01)
(Continued)

(52) U.S. Cl.
CPC .............. *B60G 9/02* (2013.01); *B60G 7/02* (2013.01); *B60G 7/04* (2013.01); *B60G 9/003* (2013.01); *B60G 11/04* (2013.01); *B60G 11/10* (2013.01); *B60G 11/42* (2013.01); *B60G 2200/326* (2013.01); *B60G 2202/112* (2013.01);
(Continued)

(58) Field of Classification Search
CPC .......... B60G 9/003; B60G 11/10; B60G 7/02; B60G 11/42; B60G 9/02; B60G 7/04; B60G 11/04; B60G 2202/143; B60G 2204/418; B60G 2204/1482; B60G 2204/143;
(Continued)

(56) References Cited

U.S. PATENT DOCUMENTS 3,294,390 A * 12/1966 Warmkessel ......... B60G 11/465
  267/31
3,970,293 A *  7/1976 Sweet .................. B60G 11/465
  267/31
(Continued)

FOREIGN PATENT DOCUMENTS

DE        3035915 A1    4/1982
DE        4112213 C  *  5/1992
(Continued)

*Primary Examiner* — Toan C To
(74) *Attorney, Agent, or Firm* — Raymond L. Coppiellie; Burgess Law Office, PLLC

(57) ABSTRACT

A vehicle axle suspension having a leaf spring unit suspending a rigid axle on a structural component or portion of the vehicle. The leaf spring unit arranged on the vehicle to extend parallel with a longitudinal axis of the vehicle. A first bearing unit, secured to the structure, and pivotably connects, at a first pivot axis, to a first end portion of the leaf spring unit. A second bearing unit is secured to the structure. A connection arm pivotably connects at one end, at a second pivot axis, to the second bearing unit. The other end of the connection arm pivotably connects, at a third pivot axis, to a second end portion of the leaf spring unit. The second bearing unit including at least one resilient spring element engaging the connection arm wherein the connection arm is supported on the resilient spring element from a pivoting about the second pivot axis a predetermined extent.

14 Claims, 1 Drawing Sheet

(51) Int. Cl.
  *B60G 11/04* (2006.01)
  *B60G 9/00* (2006.01)
  *B60G 7/02* (2006.01)
  *B60G 7/04* (2006.01)
  *B60G 11/42* (2006.01)

(52) U.S. Cl.
  CPC .. *B60G 2202/143* (2013.01); *B60G 2204/121* (2013.01); *B60G 2204/143* (2013.01); *B60G 2204/1482* (2013.01); *B60G 2204/418* (2013.01); *B60G 2204/4502* (2013.01)

(58) Field of Classification Search
  CPC ...... B60G 2204/121; B60G 2204/4502; B60G 2202/112; B60G 2200/326
  USPC ....... 280/124.163, 124.165, 124.17, 124.174
  See application file for complete search history.

(56) References Cited

U.S. PATENT DOCUMENTS

| | | | | |
|---|---|---|---|---|
| 4,420,171 A | * | 12/1983 | Raidel | B60G 5/047 267/31 |
| 4,988,080 A | | 1/1991 | Shah | |
| 5,098,121 A | * | 3/1992 | Walton | B60G 11/04 280/124.156 |
| 5,217,248 A | * | 6/1993 | Reast | B60G 5/047 280/124.106 |
| 5,351,986 A | * | 10/1994 | Hedenberg | B60G 11/465 267/31 |
| 5,820,147 A | * | 10/1998 | Rohweder | B60G 9/00 280/93.51 |
| 6,019,384 A | * | 2/2000 | Finck | B60G 11/125 267/260 |
| 7,950,678 B1 | * | 5/2011 | Bauder | B60G 5/047 280/124.17 |
| 2004/0155424 A1 | * | 8/2004 | Hicks | B60G 11/28 280/124.17 |
| 2009/0115157 A1 | | 5/2009 | Platner et al. | |
| 2011/0057409 A1 | * | 3/2011 | Leeder | B60G 11/04 280/124.175 |
| 2016/0152106 A1 | * | 6/2016 | Preijert | F16F 3/023 280/124.116 |
| 2019/0111749 A1 | * | 4/2019 | Simon | B60G 11/04 |

FOREIGN PATENT DOCUMENTS

| | | |
|---|---|---|
| GB | 488894 A | 7/1938 |
| GB | 807422 A | 1/1959 |
| GB | 915402 A | 1/1963 |
| GB | 1212411 A | 11/1970 |
| GB | 1515362 A | 6/1978 |
| GB | 2195589 A | 4/1988 |

* cited by examiner

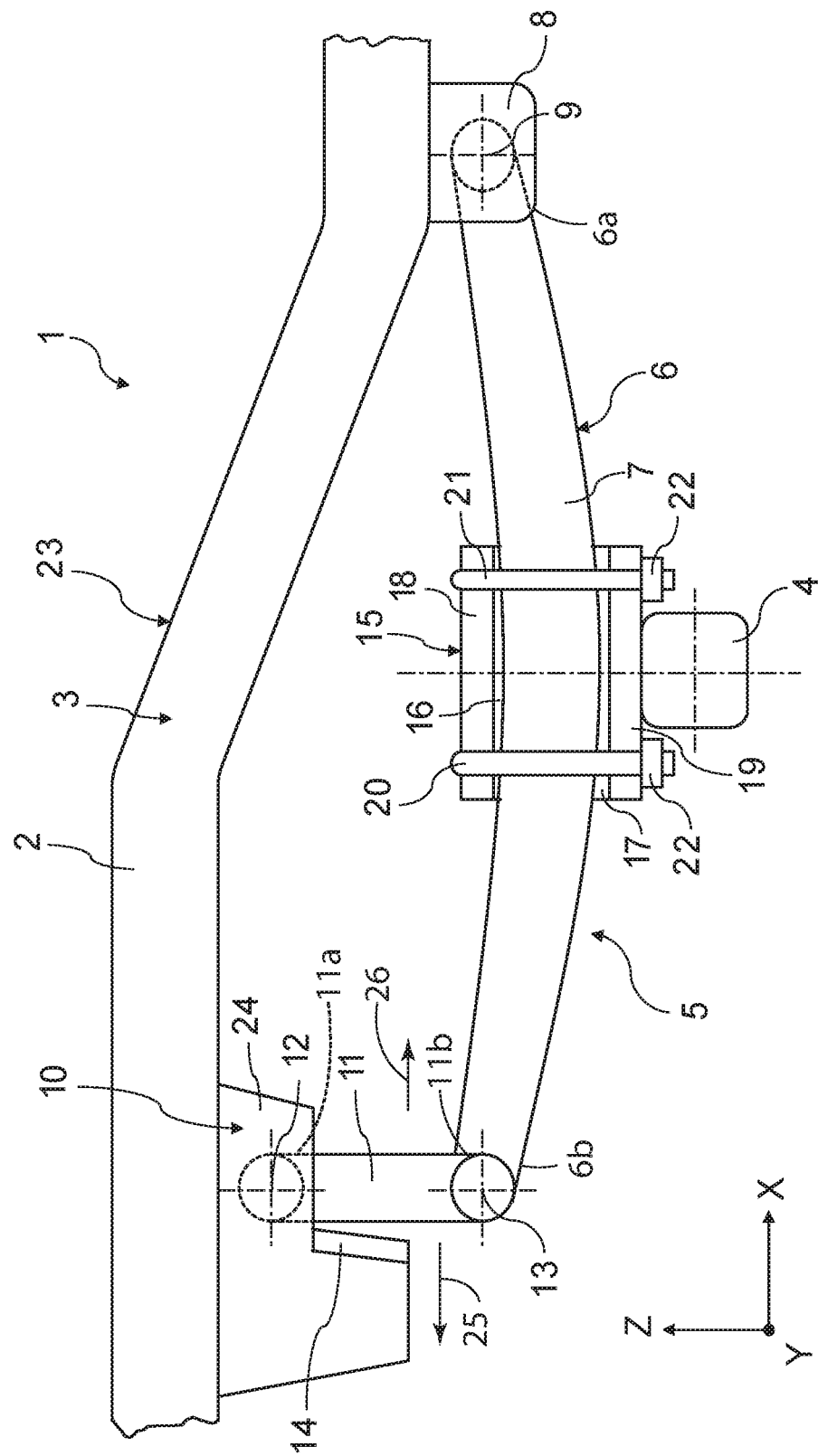

VEHICLE SUSPENSION

CROSS-REFERENCE TO RELATED APPLICATIONS

Not Applicable.

BACKGROUND OF THE INVENTION

1. Field of the Invention

The invention relates generally to a vehicle suspension; and more specifically to an axle suspension for a vehicle having a leaf spring and resilient element.

2. Description of Related Art

Axle suspensions having a leaf spring unit and a connection arm are used to suspend a rigid rear axle in a cushioned manner on a vehicle structure. The rigid axle is supported on the vehicle structure by two leaf spring units extending in the longitudinal direction of the vehicle. The leaf spring unit is pivotably connected at one end to a bearing unit secured to the vehicle structure. At the other end, the leaf spring unit is indirectly connected by a connection arm to another bearing unit secured to the vehicle structure, wherein the connection arm is pivotably connected to the leaf spring unit and the other bearing unit. The connection arm compensates for a length variation of the leaf spring unit in the longitudinal vehicle direction; a variation brought about by resilient deformation of the leaf spring unit. Because, if the leaf spring unit were connected at both sides to the vehicle structure, resilient deformation of the leaf spring unit is not possible without using a pivotable connection arm.

SUMMARY OF THE INVENTION

A vehicle axle suspension including a leaf spring unit suspending at least one rigid axle on a structure of the vehicle. The leaf spring unit arranged on the vehicle and extending parallel with a longitudinal axis of the vehicle. The suspension having a first bearing unit secured to the structure wherein a first end of the leaf spring unit is pivotably connected to the first bearing unit at a first pivot axis. A second bearing unit is secured to the structure with a connection arm pivotably connected at one end, about a second pivot axis, to the second bearing unit and pivotably connected at the other end, about a third pivot axis, to a second end portion of the leaf spring unit. A resilient spring element is arranged relative to the connection arm and second bearing unit wherein the connection arm engages the resilient spring element which limits pivotal movement about the second pivot axis by a predetermined extent.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic side view of a vehicle suspension system according to one embodiment of the invention.

DETAILED DESCRIPTION OF THE PREFERRED EMBODIMENTS

The following description of the preferred embodiment(s) is merely exemplary in nature and is in no way intended to limit the invention, its application, or uses.

FIG. 1 schematically illustrates an axle suspension, seen generally at 5, for use with a vehicle 1 according to an embodiment of the invention.

The vehicle 1 includes a structure 23, shown in FIG. 1, as a portion of an S-shaped longitudinal carrier 2 of a ladder-type frame 3 of the structure. The longitudinal carrier 2 extending parallel with a longitudinal axis X of the vehicle 1. While not shown, another longitudinal carrier of the ladder type frame 3 extends parallel with the longitudinal carrier 2 shown in FIG. 1, which in the present view is behind the shown longitudinal carrier 2.

The vehicle 1 includes a rigid axle 4, shown herein with a square cross-section, having rotatably supported wheels (not shown) on each end thereof. The rigid axle 4 extends in a transverse vehicle direction Y.

The axle suspension 5 is arranged on the longitudinal carriers 2 and suspends the rigid axle 4 on the structure 23 or the ladder type frame 3.

The axle suspension 5 includes a leaf spring unit 6 associated with each longitudinal carrier 2 for suspending the rigid axle 4 on the structure 23 of the vehicle 1. Again, FIG. 1 shows only one leaf spring unit 6, with the leaf spring unit not shown constructed and arranged in accordance with the shown leaf spring unit 6. The leaf spring units 6 are arranged on the vehicle 1 to extend parallel with the longitudinal axis X of the vehicle 1. Each leaf spring unit 6 is formed by a single leaf spring 7.

The axle suspension 5 includes for each longitudinal carrier 2 a first bearing unit 8, secured to the structure 23 or the ladder type frame 3. Again, the bearing unit not shown is constructed and arranged in accordance with the shown first bearing unit 8. FIG. 1 illustrates a first end portion of the leaf spring unit 6 pivotably connected, about a first pivot axis 9, to the first bearing unit 8 and forming a first rotary joint.

The axle suspension 5 includes for each longitudinal carrier 2 a second bearing unit 10 secured to the structure 23 or the ladder type frame 3. FIG. 1 shows a connection arm 11 pivotably connected at one end 11a, at a second pivot axis 12, to the bearing unit 10 and forming a second rotary joint. The connection arm 11 pivotably connected the other end 11b, at a third pivot axis 13, to a second end portion 6b of the leaf spring unit 6 and forming a third rotary joint. FIG. 1 shows, because of the perspective shown, only one bearing unit 10 and one connection arm 11. The bearing unit not shown and the connection arm not shown are constructed and arranged in accordance with the shown second bearing unit 10 or in accordance with the shown connection arm 11.

The second bearing unit 10 includes a resilient spring element 14, in an exemplary embodiment, an elastomer block arranged relative to the connection arm 11 on the second bearing unit 10 that controls pivoting of the connection arm 11 about the second pivot axis 12. As illustrated, the second bearing unit 10 and spring element 14 prevent the connection arm 11 from pivoting about the second pivot axis 12 in a counter-clockwise direction by a predetermined extent. The connection arm 11 may pivot, that is move, in a direction, shown by arrow 26, toward first bearing unit 8;

however, the resilient spring element 14 limits travel in a direction away from, shown by arrow 25, the first bearing unit 8.

As illustrated the second bearing unit 10 includes an L-shaped retention member 24, a portion of which extends transversely to the respective longitudinal carrier 2 and to whose side facing the respective connection arm 11 the respective resilient spring element 14 is secured.

Each leaf spring unit 6 of the axle suspension 5 includes a securing unit 15 fixed to the respective leaf spring unit 6 for securing the rigid axle 4 to the respective leaf spring unit 6. Again, FIG. 1 shows only one securing unit 15. The axle suspension 5 includes two resilient damping elements 16 and 17 for each securing unit 15. Once more, additional damping units not shown are constructed and arranged in accordance with the shown resilient damping elements 16 and 17. Each damping element 16, 17 is constructed as an elastomeric member. The shown resilient damping elements 16, 17 are arranged between the leaf spring unit 6 and the securing unit 15.

Each securing unit 15 includes two securing plates 18, 19 between which the resilient damping elements 16, 17 and the respective leaf spring unit 6 are clamped. As shown the securing unit 15 includes two U-shaped screw bolts 20, 21, which at the structure 23 side, engage the respective securing plate 18, resilient damping elements 16 and 17 and the respective leaf spring unit 6 and whose free end portions are secured to the securing plate 19 by nuts 22 engaging the threaded ends thereof. The rigid axle 4 is fixed to the respective securing plate 19.

The exemplary embodiment discloses an axle suspension 5 wherein the second bearing unit 10 includes a resilient spring element arranged relative to the connection arm 11 on the second bearing unit 10. The connection arm 11 is supported on the resilient spring element 14 which limits pivoting about the second pivot axis 12 by a predetermined extent.

When the leaf spring unit 6 of the axle suspension 5 is loaded, the leaf spring unit 6 becomes resiliently deformed, causing, in the longitudinal vehicle direction X, a variation of the length of the leaf spring unit 6. The connection arm 11 thereby pivots, away from the first bearing unit 8 in the direction of arrow 25. As long as the connection arm 11 is not in contact with the resilient spring element 14, the configuration in FIG. 1, the axle suspension 5 has a spring rate defined by the properties of the leaf spring unit 6. If the connection arm 11 pivots far enough in the direction of the arrow 25, it contacts the resilient spring element 14 and is supported thereon. In this state, the spring rate of the leaf spring unit 6 is supplemented by the spring rate of the resilient spring element 14, so the axle suspension 5 has an increased spring rate. Consequently, the axle suspension 5 has a progressive spring rate.

The resilient spring element 14 is preferably arranged relative to the connection arm 11 on the second bearing unit 10 so the connection arm 11 contacts the resilient spring element 14 only when the leaf spring unit 6 reaches a specific resilient deformation degree. In the disclosed embodiment, the first and the second pivot axes 9, 12 are arranged in a fixed manner on the vehicle structure 23, while the third pivot axis 13 moves on a circular path as the axle suspension 5 is loaded. The respective selection of the arrangement of the resilient spring element 14 relative to the connection arm 11 provides an adaptive spring rate axle suspension adapted to a respective application predetermined from the pivot angle the connection arm 11 contacts the resilient spring element 14.

The leaf spring unit 6 may be formed, at least partially from a metal, a metal alloy or a composite fiber material. The axle suspension 5 preferably comprises two leaf spring units 6 articulated according to the disclosed embodiment to the vehicle structure and extending parallel with each other for suspending an individual rigid axle or two or more rigid axles on the vehicle structure. Each leaf spring unit 6 can be arranged on the vehicle to extend parallel with the longitudinal vehicle axis X.

The first bearing unit 8 secured to the vehicle structure 23 may be connected to the vehicle structure in a materially engaging and/or non-positive-locking manner. The first bearing unit 8 may be produced at least partially from metal or a metal alloy. The first bearing unit 8 may, for example, have two parallel members on which there is supported a bearing pin connected to the first end portion 6a of the leaf spring unit 6. The bearing pin defines the first pivot axis 9 and can be pivotably connected to the parallel members and/or the first end portion 6a of the leaf spring unit 6. The first end portion 6a of the leaf spring unit 6 is connected to the first bearing unit 8 and pivots about the first pivot axis 9.

The second bearing unit 10 secured to the vehicle structure 23 may be connected to the vehicle structure in a materially engaging and/or non-positive-locking manner. The second bearing unit 10 may be produced at least partially from metal or a metal alloy. The second bearing unit 10 may also have two or more resilient spring elements 14 connected in parallel or in series with respect to a force path. The second bearing unit 10 may, for example, have two parallel members on which there is supported a bearing pin connected to one end 11a of the connection arm 11 or which extends through a bearing lug formed on this connection arm end 11a. The bearing pin defines the second pivot axis 12 and can be pivotably connected to the parallel members and/or one end 11a of the connection arm 11. One end 11a of the connection arm 11 is connected to the second bearing unit 10 and pivots about the second pivot axis 12. The other end 11b of the connection arm 11 may include a bearing lug through an additional bearing pin extends, defining the third pivot axis 13. The bearing pin extending through a bearing lug on the second end portion 6b of the leaf spring unit 6. The other end 11b of the connection arm 11 connected to the second end portion 6b of the leaf spring unit 6 and pivots about the third pivot axis 13.

In one embodiment, the resilient spring element 14 is an elastomer or elastomeric block. For example, the resilient spring element 14 may be a rubber block. The elastomer block may be connected by a mechanical connection or in a materially engaging manner; for example, by vulcanization to the second bearing unit 10. Alternatively, the resilient spring element 14 may be formed by a pressure spring mechanically secured to the second bearing unit 10.

Another embodiment provides a leaf spring unit 6 having a single leaf spring 7. The leaf spring unit 6, in comparison with a leaf spring unit formed by multiple, stacked leaf springs, is constructed in a lightweight manner. In addition, no production of a leaf spring assembly is required which reduces the production complexity of the axle suspension. The disclosed embodiment provides an axle suspension 5 having a desired progressive spring rate because from a specific loading degree, the spring rate of the leaf spring 7 is supplemented by the spring rate of the resilient spring element 14. The leaf spring 7 may be produced partially or completely from a metal, a metal alloy or a composite fiber material.

In another embodiment, the axle suspension includes at least one securing unit 15 fixed to the leaf spring unit 6 for securing the rigid axle 4 to the leaf spring unit 6. The securing unit 15 may be connected to the leaf spring unit 6 in a non-positive-locking manner or materially engaging manner. The securing unit 15 may include two securing plates 18, 19 between which a portion of the leaf spring unit 6 can be clamped. The securing unit 15 may use U-shaped screw bolts 20, 21. The securing plate 19 arranged facing away from the vehicle structure 23 may be connected to the rigid axle 4 in a non-positive-locking manner or materially engaging manner.

The axle suspension 5 includes resilient damping elements 16, 17 arranged between the leaf spring unit 6 and the securing unit 15. The resilient damping elements 16, 17 dampen vibrations of the rigid axle 4 occurring during vehicle travel and transmitted to the securing unit 15. Damping brings about a more comfortable ride with weaker vibrations and lower noise emissions. The resilient damping elements 16, 17 may be an elastomer member, in particular, a rubber member. The securing unit 15 may also be supported by one or more corresponding resilient damping elements on the leaf spring unit.

As disclosed herein, the vehicle has a structure including, at least one rigid axle and at least one axle suspension for suspending the rigid axle on the structure; with an axle suspension constructed according to one of the above-mentioned embodiments or any combination of at least two of these embodiments with each other.

The advantages mentioned above with reference to the axle suspension are accordingly connected with the vehicle. The structure may have a frame which has longitudinal carriers and on which the axle suspension is secured. The vehicle may also have two or more rigid axles suspended via the axle suspension on the vehicle structure.

According to an advantageous embodiment, the structure has a ladder-type frame with longitudinal carriers, wherein the axle suspension is arranged on at least one longitudinal carrier. Preferably, the axle suspension is secured to two longitudinal carriers of the ladder type frame which extend parallel with each other, wherein a leaf spring unit with the associated bearing is associated with each longitudinal carrier.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle axle suspension comprising:
   at least one leaf spring unit for suspending at least one rigid axle on a structure of a vehicle, wherein the leaf spring unit is arranged on the vehicle to extend parallel with a longitudinal axis of the vehicle;
   a first bearing unit secured to the structure and to which a first end portion of the leaf spring unit is pivotably connected about a first pivot axis;
   a second bearing unit secured to the structure;
   at least one connection arm pivotably connected at one end about a second pivot axis to the second bearing unit and pivotably connected at the other end about a third pivot axis to a second end portion of the leaf spring unit; and
   a resilient spring element arranged on one side of the leaf spring unit, with both the first end portion of the leaf spring unit and the second end portion of the leaf spring unit are on the same side of the resilient spring element relative to the connection arm and second bearing unit, so the connection arm engages the resilient spring element which limits pivotal movement about the second pivot axis by a predetermined extent and limits travel of the second end portion of the leaf spring unit in a direction away from the first bearing unit.

2. The suspension of claim 1 wherein the resilient spring element is an elastomeric block.

3. The suspension of claim 1 wherein the leaf spring unit is a single leaf spring.

4. The suspension of claim 1 including a securing unit fixed to the leaf spring unit securing the rigid axle to the leaf spring unit.

5. The suspension of claim 1 including a resilient damping element arranged between the leaf spring unit and the securing unit.

6. The suspension of claim 1 wherein the structure has a ladder frame configuration including longitudinal carriers, with the axle suspension arranged on at least one of said longitudinal carriers.

7. A vehicle comprising:
   a structure;
   an axle;
   an axle suspension connected to said structure and suspending the axle on the structure, the axle suspension including a leaf spring unit extending parallel with a longitudinal axis of the vehicle;
   a first bearing unit secured to the structure, a first end portion of the leaf spring unit pivotably connected to said first bearing unit about a first pivot axis;
   a second bearing unit secured to the structure;
   a connection arm pivotably connected at one end to the second bearing unit about a second pivot axis and pivotably connected at the other end to a second end portion of the leaf spring unit about a third pivot axis; and
   a resilient element between the connection arm and second bearing unit wherein the connection arm engages the resilient element and limits pivotal movement about the second pivot axis in a direction away from the first bearing unit.

8. The suspension of claim 7 wherein the resilient element is an elastomeric member.

9. The suspension of claim 7 wherein a portion of the connection arm between the ends thereof contacts the resilient element with the contact location determining a spring rate of the suspension.

10. A vehicle suspension comprising:
    a leaf spring;
    a first bearing unit, a first end of the leaf spring pivotably connected to said first bearing unit;
    a second bearing unit;
    a connection arm pivotably connected at one end to the second bearing unit and pivotably connected at the other end to a second end of the leaf spring;
    a resilient element between the connection arm and second bearing unit wherein the connection arm engages the resilient element and limits pivotal movement about a second pivot axis wherein a spring rate of the leaf spring is supplemented by a spring rate of the resilient element providing a progressive spring rate; and
    wherein said second bearing unit has a retention member having a side facing said connection arm, said resilient element secured to said side.

11. The vehicle suspension of claim 10 wherein said connection arm engages said resilient element between opposing ends thereof, wherein the engagement location determines a spring rate.

12. The vehicle suspension of claim 10 wherein the resilient element is an elastomeric member.

13. The vehicle suspension of claim 10 wherein a portion of the connection arm between the ends thereof contacts the resilient element with the contact location determining a spring rate of the suspension.

14. The vehicle suspension of claim 10 wherein the connection arm engages the resilient element and limits pivotal movement about the second pivot axis in a direction away from the first bearing unit.

* * * * *